June 21, 1960     R. C. HUNTINGTON     2,942,257
RADAR TESTER
Filed Dec. 12, 1955     2 Sheets-Sheet 1
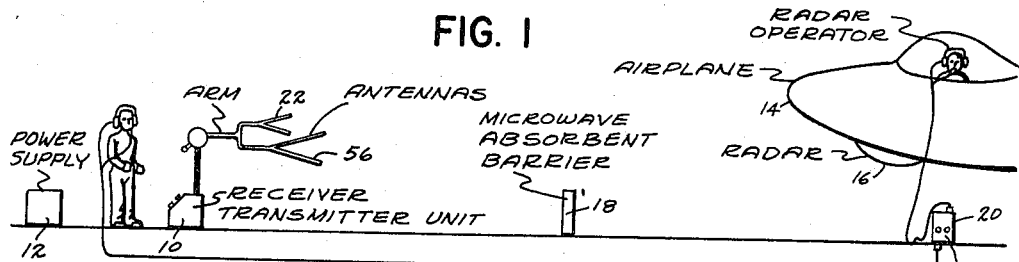
FIG. 1
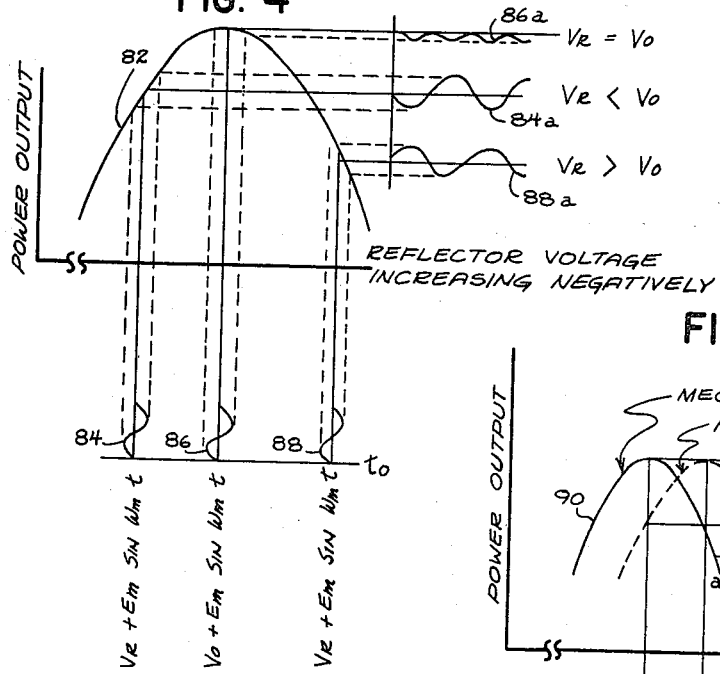
FIG. 4
FIG. 5
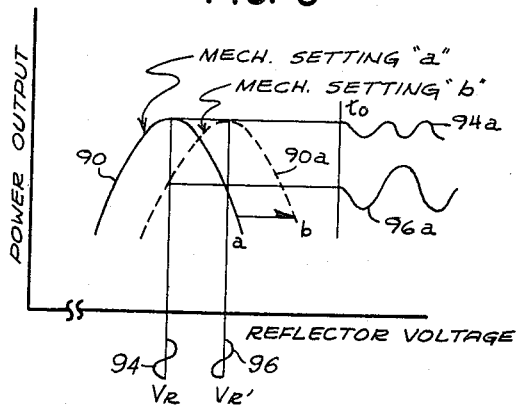
FIG. 3
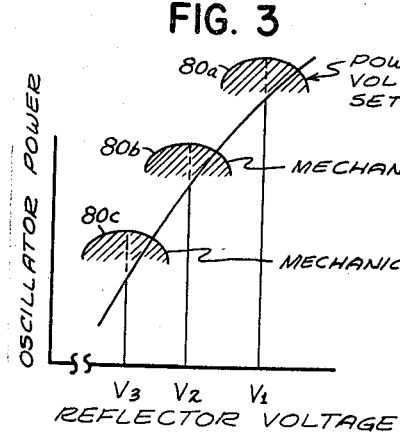
INVENTOR.
ROBERT C. HUNTINGTON
BY
Stuart R. Peterson
ATTORNEY

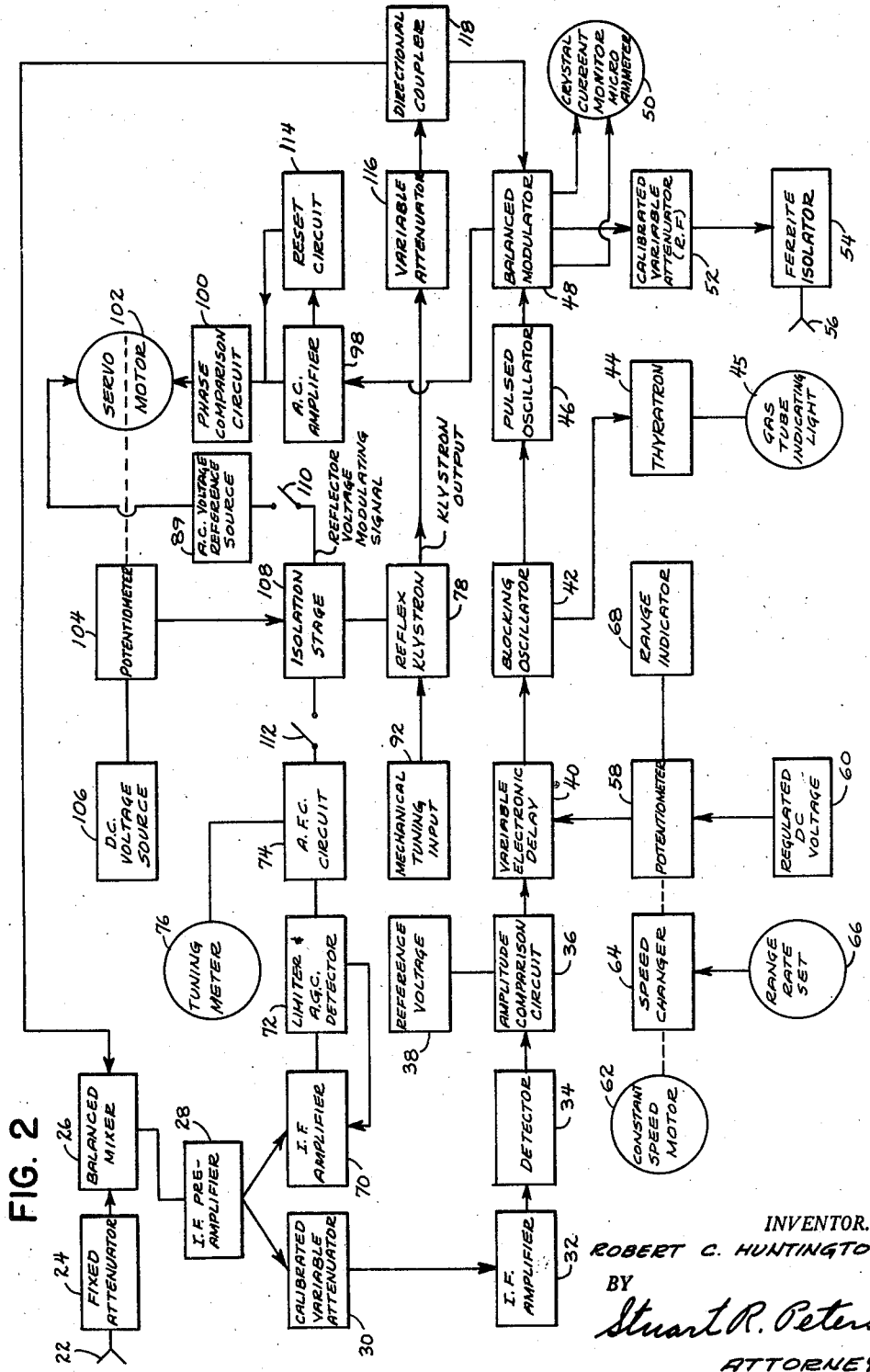

United States Patent Office 2,942,257
Patented June 21, 1960

2,942,257
RADAR TESTER

Robert C. Huntington, St. Paul, Minn., assignor to General Mills, Inc., a corporation of Delaware Filed Dec. 12, 1955, Ser. No. 552,578

30 Claims. (Cl. 343—17.7)

This invention relates to pulse echo systems and pertains more particularly to apparatus for ascertaining whether such systems are functioning properly.

One object of the instant invention is to provide a radar tester that is capable of ascertaining in a rapid manner the overall degree of operational fitness of the radar set undergoing test.

Another object of the invention is to provide sufficient information so that the operator can diagnose the cause of system malfunctioning, should such be the case.

More specifically, in the realization of the foregoing aims the tester is equipped to measure the radar transmitted power and the radar receiver sensitivity. In this regard it is contemplated that the radar testser be located in front of the radar set and just outside the Fresnel zone thereof. By means of a receiving horn antenna forming a part of the tester the radar signal is received and an indication of its amplitude obtained. After a suitable time delay, which delay when accurately controlled simulates the range of a target, the tester generates an output signal of known power which is transmitted to the radar set through a separate transmitting horn. The received signal measurement is in effect a measurement of the radar transmitted pulse peak power and the controlled measured output signal provides for a determination of the radar receiver sensitivity.

A further object of the invention is to provide a time delay between the received and the transmitted signals that is adjustable to such an extent that a target range of from between five and twenty miles can be simulated. Also, it is an aim to vary the time delay at a continuous rate so that target speed is simulated, such speed falling within the rate range of from between 200 to 600 knots. These ranges, of course, are only exemplary.

Another object of the invention is to provide a tester of the foregoing type that will be very simple in its operation, requiring relatively inexperienced personnel. Further, it may be explained that the system requires the employment of only one oscillator tube rather than two. For instance, when klystron or magnetron tubes are employed as the oscillator tube, only one such tube is needed.

Further, another object of the invention is to provide testing apparatus of this character that will be exceptionally reliable in its operation over fairly long periods of time without requiring extensive re-calibration of the various components comprising the system.

A still further advantageous feature resides in the fact that a testing system constructed in accordance with the teachings of the present invention requires no physical connection to the radar set, thereby obviating any need for revamping the radar set to permit its testing and of course permitting ready use of the testing equipment for different types of radar installations.

Yet another object of the invention is to provide apparatus for testing radar that will be portable in nature, allowing its use under a variety of circumstances. For instance, it is a desideratum of the invention to utilize the equipment for the testing of radar installed on various types of aircraft, it being possible to move the radar tester as a unit to a vantage point in proximity to the particular craft that is to have its radar set tested.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

Figure 1 is a schematic lay-out of the radar tester system in actual use;

Fig. 2 shows the radar tester in block diagram form, and

Figs. 3, 4, and 5 illustrate various curves relating to the klystron tuning circuit.

Referring first to Fig. 1, the lay-out view there presented is intended to give a general idea as to how the radar tester is to be employed. Accordingly, the radar tester has been designated in its entirety by the reference numeral 10, it receiving power from a source or supply labelled 12. The tester 10 is located in front of a parked aircraft 14 just outside of the Fresnel zone of a radar set 16 mounted in the nose of said aircraft. Intermediate the radar tester and the parked aircraft 14 is a microwave absorbent barrier 18 for the purpose of eliminating all ground reflections so that the radar tester 10 will receive only a direct signal from the radar set 16. In carrying out the test, two technicians are required, one being stationed in the aircraft 14 and one at the radar tester 10. These two technicians are in constant communication with each other via a field telephone system 20.

With the above described arrangement in mind, attention is now directed to the block diagram set forth in Fig. 2. From this diagram it can be seen that the radar tester 10 includes an antenna 22 for receiving a radar pulse signal transmitted by the radar set 16 (Fig. 1). The antenna 22 feeds its signal directly to a fixed attenuator 24 coupled to a balanced mixer 26. The balanced mixer is a standard type of either the hybrid tee or short-slot variety. After attenuation, the radar pulse signal is mixed with a continuous wave output from an automatic frequency controlled local oscillator circuit to be described hereinafter. The local oscillator frequency is selected so that the output of the mixer 26 will be a forty megacycle intermediate frequency pulse, or more precisely, a train of such pulses which are fed to a gain-stable I.F. preamplifier 28.

The output from the preamplifier 28 is channelled in two directions as far as the circuitry of the radar tester is concerned. We will deal with one course at the present time, this course being by way of a calibrated variable attenuator designated by the numeral 30. More will be said later on concerning the duties of this attenuator; however at the present moment, it will be sufficient to say that the output from the variable attenuator 30 is fed to a second gain-stable I.F. amplifier strip 32. Both of the amplifiers 28 and 32 are conventional staggered-tuned amplifiers with additional gain-stability achieved by means of a special power supply which controls the plate and screen voltage in order to compensate for changes in the heater voltages. The signal then proceeds to a detector 34 whose output will be a pulse having a width equal to that of the radar signal pulse and of an amplitude proportional to the peak of the received radar signal.

It is actually the amplitude of the pulse produced by the detector 34 that we are primarily concerned with and in this regard it is to be explained that the amplitude of this detector video pulse is to be compared with a preset known reference voltage. To do this, the video pulse is fed to an amplitude comparison circuit 36 which is an amplitude discriminating circuit of the multiar type in which the input video pulses as received from the detector produce a large output pulse by regenerative action when and only when the amplitude of the input pulse exceeds the fixed reference voltage. The discrimination level is, of course, within the linear operation of the I.F. amplifiers 28 and 32.

As indicated above, comparison is to be made of the video output pulse from the detector 34 with a reference voltage and the source or supply for this reference voltage has been indicated by the numeral 38. The value of the reference voltage, a D.C. voltage, is susceptible to variation according to circuit design considerations. In the present situation, however, the voltage will be assumed to be in the neighborhood of 1 to 1.5 volts. Assuming that we have selected 1.5 volts, the amplitude comparison circuit functions in a fashion such that it will generate its output pulse only when the incoming pulse amplitude exceeds the 1.5 volt reference voltage. Therefore, for detector pulses greater than the reference voltage, the amplitude comparison circuit pulse output will be available for further utilization.

Continuing with the description, it is to be pointed out that the output pulse generated by the amplitude comparison circuit is fed to a variable electronic delay circuit 40 composed of a univibrator, a Miller integrator, and a second multiar circuit. More will be said presently concerning the variable nature of the delay circuit 40. At this time, however, it is of interest to merely mention that the amount of delay introduced by this circuit is accurately controlled so that the resulting delay represents or simulates the range of a target. The delayed output pulse from the circuit 40 is fed to a blocking oscillator 42 capable of generating a pulse having a time duration corresponding to that of the originally received radar pulse.

The pulse generated by the blocking oscillator 42 serves two purposes, the first of which will now be dealt with. In this regard, it is to be noted that the output pulse from the oscillator 42 is fed to the grid of the gas tube 44, such as a thyratron, and in circuit with the thyratron tube 44 is a gas tube indicating light 45, such as an ordinary neon tube. The function of the thyratron 44, remembering that the blocking oscillator pulse output has a time duration approximating one microsecond, is to extend the conduction time of the indicating light 45 beyond this extremely short time period so that the indicating light will appear definitely visible to the human eye. The specific manner in which the indicating light is used is best reserved for discussion during a typical operational sequence so, accordingly, a more detailed explanation of the role played by this light will be given hereinafter.

As stated above, the blocking oscillator 42 produces an output pulse having a prescribed width, and the second use therefor is now to be mentioned. This pulse is fed, in addition to the thyratron tube 44, to a pulsed oscillator 46, the purpose of which is to produce a forty megacycle pulse having a prescribed pulse width which stems from the triggering pulse received from the blocking oscillator. This pulse from the oscillator 46 is fed to a balanced modulator 48 which is coupled to the local oscillator circuitry already mentioned but yet to be described. The balanced modulator, like the mixer 26, may be of the hybrid tee or short-slot variety.

One of the objects of the invention is to measure the power transmitted back to the radar set 16 which is undergoing test and to this end there is employed a crystal current monitor microammeter 50 capable of indicating the current in the microwave energy coming out of the balanced modulator 48. Also coupled to the balanced modulator 48 is a calibrated variable attenuator 52 which passes the microwave energy to a ferrite isolator 54, the isolator 54 in turn being connected to a transmitting antenna 56. The function of the isolator 54 is to make certain that the energy to be transmitted to the radar set 16 passes to the antenna 56 but at the same time that the antenna 56 is utilized only for transmission purposes and does not receive any signal transmitted by the radar set 16. Of course energy transmitted by the set 16 is to be received by the antenna 22 and not the transmitting antenna 56 for if energy were received by the antenna 56, then the system would be disturbed to such an extent that it would not function properly. In other words the isolator is unidirectional in character.

Having already indicated that it is a desideratum of the invention to simulate different ranges, it will now be explained that it is also an aim of the invention to simulate a range rate of a target. In this connection, as already mentioned quite briefly, it is essential to provide a controllable variable time delay to the circuit 40 so that transmitted pulses will be relayed back to the radar set 16 after a predetermined lapse of time so as to simulate the range of a target. To simulate the range rate of a target, however, it is necessary to vary this time delay in a uniform manner. Therefore, returning to the circuit 40 for further description, it is to be pointed out that the biasing of the multiar circuit constituting the variable delay circuit 40 is changed in accordance with a predetermined schedule. To this end a potentiometer 58 is utilized, this potentiometer being in the form of a helipot having its wiper driven in a prescribed manner. Supplying the potentiometer 58 with a regulated D.C. voltage is a source 60. The above-alluded to wiper is driven by a constant speed motor 62 via a speed changer 64. The speed changer 64 may assume a variety of different constructions but, suggestively, it may constitute a conventional ball and disk integrator. Different range rates are established by setting the speed changer to a value corresponding to any range rate between 200 and 600 knots. To accomplish this, a calibrated dial 66 having a suitable adjustment is connected to the speed changer 64 so that the operator or technician may select the particular range rate that is desired for the radar set 16 undergoing test. Also, as hereinbefore mentioned, it is desired to indicate the range that is employed during the complete testing of a radar set, and therefore a counter or indicator 68 is mechanically coupled to the wiper shaft of the potentiometer 58 and in effect reads the wiper position which position, of course, is indicative of the particular range. Thus, when there is no change in speed by reason of the speed changer 64 being inactivated, the wiper remains stationary and the target range is ascertained by virtue of the particular position of the wiper arm of the potentiometer 58. When a range rate is desired, then, of course, the speed changer 64 is instrumental in moving the potentiometer's wiper arm at a prescribed rate so as to simulate the actual movement of a target.

If the tester is to be capable of performance evaluation of different individual radar sets, it is necessary that the tester response be linear within practical limits over the frequency range likely to be encountered by the various radars to be tested. It is further necessary that the tester klystron operate in the dominant mode and at a definite frequency with respect to that of the radar under test. This is achieved by means of the tuning and automatic frequency control circuitry now to be described.

It will be remembered that the balanced mixer 26, through the medium of the gain-stable I.F. amplifier 28, produces pulses that follow two courses, these pulses in traversing the second path being fed to another I.F. amplifier 70 and then to the limiter and automatic gain control detector unit 72. From the limiter and A.G.C.

detector unit 72, the output is fed to an automatic frequency controlled circuit 74, which may be of the conventional Foster-Seeley discriminator type and which slaves the local oscillator frequency to the radar frequency during the test, providing, of course, that radar signals are received in a continuous manner. In order to ascertain when the A.F.C. circuit 74 is tuned, there is provided a tuning meter 76. If the A.F.C. circuit 74 is at the prescribed forty megacycle frequency, then, of course, there is no output from this circuit. However, if the frequency is either above or below, then a D.C. voltage of appropriate polarity is sent out depending as far as its magnitude is concerned upon the deviation in frequency from the desired forty megacycles. At this point it might be explained that we have somewhat arbitrarily selected a local oscillator frequency of forty megacycles above whatever radar frequency is then being encountered, this frequency lending itself readily to practical utilization.

The fundamental or primary purpose of the klystron automatic tuning circuitry is to cause a 2K25 reflex klystron, or similar klystron, to operate at the peak of its "A" power mode and at a frequency which is in the center of the electronic linear frequency control characteristic for this tube where the zero or reference control frequency is prescribed by the operating conditions for the circuit. The klystron tube in this situation has been given the reference numeral 78 appearing in block form in Fig. 2. It might be mentioned that the second purpose for the tuning circuitry is to enable the operator to tune the klystron 78 to a center frequency which is displaced by the amount of the intermediate frequency from the frequency of the radar to be tested.

The reflex klystron tuning circuitry presently to be described was devised in order to provide a reflector voltage to the klystron 78 that would produce a maximum power output for a given mechanical tuning, as already prefaced above when reference was made to dominant mode operation. By reason of the arrangement soon to be described, the circuitry makes it possible to tune the klystron 78 over its entire mechanical tuning range without the usual necessity of manually adjusting the reflector voltage for each mechanical setting.

Of help in understanding the manner in which the klystron tuning takes place are Figs. 3, 4, and 5. Referring now to Fig. 3, there is shown a portion of the output power plotted against reflector voltage characteristics for a reflex klystron. The several curves representing this relationship bear the numerals 80a, 80b, and 80c. More particularly, it is to be observed from an inspection of Fig. 3 that a reflector voltage of the value $V_1$ yields a maximum power output when the klystron is mechanically tuned to a setting designated by the letter "a" whereas a reflector voltage $V_2$ is required to obtain a maximum power at a setting "b." It is to be noted that the klystron will not oscillate at the setting "b" with a reflector voltage having a value $V_1$. Therefore as the klystron is mechanically tuned over its entire frequency range, it is necessary that the reflector voltage be varied in a particular manner in order to make sure that a maximum power output is always obtained.

Directing attention now to Fig. 4, the klystron power output is plotted as a function of reflector voltage for a particular mechanical tuning, this curve being represented by the numeral 82. If a small sinusoidal voltage, as indicated by the numerals 84, 86 and 88, is superimposed on the reflector voltage from an A.C. source 89 by closing a switch 110, the power output will contain, of course, a modulation component as presented by the resultant curves 84a, 86a and 88a. It can be appreciated, still referring to Fig. 4, that this modulation in power will be in phase with the reflector modulating signal when $V_R$ is greater than $V_0$ and will be in phase opposition when $V_R$ is less than $V_0$.

When the average reflector voltage is of the value $V_0$, the power modulation component will repeat itself each half cycle of the reflector modulating voltage. This signal will not cause output from the phase comparison circuit (to be mentioned later) and will be referred to as being zero. The power modulation component may thus be utilized as an error signal in a servo loop which is to be constructed in such a manner so as to vary the reflector voltage as the value $V_0$ is approached. This yields maximum power.

In describing what happens, attention is directed to both Figs. 2 and 5. We will assume in this respect that an initial mechanical klystron tuning "a" and reflector voltage $V_R$ has been obtained, as indicated by the curve 90. Under these assumed conditions, power ouput is a maximum and the frequency component of the output power is zero. Now if the klystron 78 is tuned by its mechanical adjustment indicated at 92 to the mechanical setting "b," its power output with respect to its reflector voltage is effectively shifted horizontally as indicated in Fig. 5 by the dotted line curve 90a. It is now that an error signal is generated by the modulation in the power output which is in phase opposition to the reflector modulation voltage. Here the superimposed A.C. voltage signal is indicated by the numerals 94 and 96, the out-of-phase relationship being readily discerned by comparing the resulting curves 94a and 96a.

Inasmuch as the balanced modulator 48 receives power from the klystron 78, a sample of this power may be taken from the balanced modulator and is first fed to an amplifier 98. This signal is graphically depicted in Fig. 5, having been given the reference numeral 96a. From the amplifier 98 the signal proceeds to a phase comparison circuit 100, and if there is no difference in phase, no output is produced from the circuit 100.

After amplification and phase comparison, the signal is fed to a servo motor 102. The direction in which the servo motor 102 rotates is dependent on the phase of the error signal coming from the phase comparison circuit 100, rotation in one direction occurring when the signals are out of phase in one sense and an opposite rotation taking place when the signals are out of phase in an opposite sense. The servo motor 102 is mechanically geared to a potentiometer 104 across which a D.C. voltage is impressed from a source 106 and whose output is passed through an isolation stage 108 to the reflector of the klystron 78, together wtih the reflector modulating signal which is at this time still present, not yet having been removed. For the particular change in the klystron mechanical tuning from "a" to "b" illustrated in Fig. 5, the servo motor rotation is such that the reflector voltage is increased so that it approaches a value $V_R'$ for which value the power will be a maximum and the error signal will then return to zero.

Since the reflector voltage is derived from a servo motor driven potentiometer, it will be apparent that the desired klystron output frequency, once attained by means of mechanical tuning, permits the reflector voltage modulating signal to be removed. The optimum reflector voltage, however, will be retained. This is accomplished by opening the previously closed switch 110.

It is the klystron 78 that produces the local oscillator frequency which is fed to both the balanced mixer 26 and the balanced modulator 48. The tuning circuit just described makes it possible to tune the klystron 78 over a very wide frequency range, namely from 8900 megacycles to 9850 megacycles. It might be mentioned that the intermediate frequency is initially acquired by tuning the klystron 78 by its mechanical tuning adjustment 92 with the A.F.C. circuit 74 disconnected by having opened a switch 112. The procedure followed in checking when this frequency condition has been reached involves reducing the klystron frequency, the I.F. difference from the radar frequency being shown by the tuning meter first indicating a deflection of one polarity followed by a deflection of opposite polarity. These deflections are defined by the shape of the characteristic of the frequency discriminator in the A.F.C. circuit. Adjusting for the null between these deflections shows that the proper frequency has been reached. Note, however, that if the frequency is reduced still further, a sequence of two deflections opposite in polarity to the first two is obtained. This means that the klystron frequency is now 40 megacycles below radar frequency. The A.F.C. cannot maintain the klystron at this frequency because the control curve is opposite to that required, and a condition of frequency instability results. Thus by observing a proper sequence of deflections, tuning for the proper A.F.C. can be assured. It is then that the modulating signal is removed from the klystron reflector voltage by reason of opening the switch 110 and the intermediate frequency is thereafter maintained electronically through the agency of the A.F.C. circuit by closing the switch 112.

Employment of a reset circuit 114 provides the klystron 78 with a reflector voltage prior to the previously alluded to mechanical tuning that results in the obtaining of the proper mode of klystron oscillation. With the klystron 78 mechanically tuned for its highest frequency oscillation, the reflector voltage is automatically driven by the potentiometer 104 to a value slightly greater than that necessary for oscillation. The reflector voltage is then made to decrease until oscillation is obtained. While not specifically labeled, a detector within the reset circuit senses when oscillation occurs and then disables the reset circuit, the tuning circuit then being in normal operation.

It is to be noted that the output from the klystron 78 is fed to a variable attenuator 116 and from there the power is delivered to a directional coupler 118. It is the directional coupler that is employed for forwarding the power to both the balanced mixer 26 and the balanced modulator 48. In this respect it will be recalled that in the early part of the description it was mentioned that an automatic frequency controlled local oscillator was involved in the circuitry for supplying the balanced mixer 26 and later on in the course of the description it was mentioned that this local oscillator also furnished power to the balanced modulator 48. At this stage of the description, it is believed evident that the klystron 78, together with its associated circuitry, comprises the local oscillator means.

In describing a typical operational sequence of the radar tester 10, it will be assumed that the klystron 78 has been placed in operation in accordance with the above outlined procedure and that this local oscillator is delivering a continuous wave output involving the radar frequency plus forty megacycles. However, a brief review of the steps taken in tuning the local oscillator will undoubtedly be helpful:

(1) Mechanical tuning is set for the highest available frequency with the A.F.C. circuit 74 disconnected by means of opening the switch 112 and a 400 c.p.s. modulating voltage is applied to the klystron reflector from the source 89.

(2) The reset circuit 114 drives the potentiometer so that a maximum negative voltage is applied to the klystron reflector.

(3) A limit switch reverses the potentiometer drive such that the reflector voltage will approach from a high (negative) side down to the value required to operate the klystron in its dominant mode.

(4) When this value is reached and the klystron begins oscillation, the reset circuit 114 is deactivated, and the automatic tuning circuit drives the potentiometer such that the klystron 78 is operated in the center of its power mode.

(5) The operator then shifts the frequency of the dominant mode downward by manual mechanical tuning, using the adjustment 92, until the tuning meter 76, which indicates the A.F.C. discriminator voltage, shows that a frequency of 40 megacycles has been reached above that of the radar frequency, the automatic tuning circuits maintaining maximum output at the dominant mode during this mechanical tuning.

(6) The A.F.C. circuit 74 is then switched in by closing switch 112 and the 400 c.p.s. modulating voltage from the source 89 which operates the automatic tuning servo loop is switched out by simply opening the switch 110. By beating the local oscillator frequency in a well-known superheterodyne fashion, the hereinbefore forty megacycle I.F. pulse is obtained.

Inasmuch as we are interested in determining the amount of transmitted radar power received from the radar set 16, it is important that the means by which this measurement is achieved be understood. Accordingly, it may be explained at this time that the amplitude comparison circuit 36 plays an important role in this achievement, for the detector 34 puts out a pulse having a magnitude proportional to the received radar pulse introduced into the tester 10 by way of the antenna 22 and the fixed attenuator 24. If this pulse coming from the detector 34 is of sufficient magnitude it will be larger than the reference voltage introduced by the source 38 and will cause the amplitude comparison circuit 36 to emit a large output pulse by regenerative action when and only when the amplitude of the pulse from the detector 34 is in excess of the voltage supplied by the D.C. voltage source 38.

While the output pulse from the amplitude comparison circuit might be fed directly to the thyratron 44, nonetheless since other aims are to be accomplished, as hereinmentioned, the pulse action is by way of the delay circuit 40 and the blocking oscillator 42. At any rate it is by virtue of a pulse coming from the circuit 36 that the thyratron tube 44 is fired and such an occurrence is instrumental in indicating that a pulse has been emitted owing to the energization of the light 45.

In utilizing the indicating light 45 in the determining of the amount of received radar power, the attenuation introduced by the attenuator 30 is increased until the indicating light 45 is out and then slowly decreased until the light just comes on. It is this threshold state of having the light just come on that indicates that the detector output pulse possesses a magnitude equal to the reference voltage. Owing to the fact that the attenuator 30 is not only variable but calibrated, the I.F. gain is constant and known, and with all other attenuations being fixed and known, the calibrated reading of this attenuator 30 provides an accurate measure of the received radar transmitted power. While the provision of this measurement will depend, of course, on the stability of the I.F. amplifiers 28 and 32, the attenuators 24 and 30, the reference voltage supplied at 38, as well as the mixer 26, nonetheless, these factors are well within the control of good design practice and no particular problem is therefore introduced.

As for checking the target range of the radar set 16 being tested, this is accomplished very readily by adjusting the speed changer 64 so that the potentiometer 58 introduces a particular bias to the electronic delay circuit 40. The range indicator 68, of course, will signify the particular range corresponding to the delay action of the circuit 40, but of course converted into distance. To set the range indicator, the potentiometer 58 is driven (through the speed changer 64) by the constant speed motor 62 until the desired range is registered on the indicator 68, and the speed changer is disengaged or unclutched from the potentiometer 58. Inasmuch as a delay of one microsecond is equivalent to a distance of approximately 164 yards it will be recognized that the delay interval is readily convertible into distance, as is done in calibrating the range indicator 68.

Due to the fact that the tester 10 is also intended for use in checking whether the computing mechanism associated with the radar set 16 is functioning properly, there is a need for varying the range in order to obtain an indication as to whether the radar computer mechanism is functioning properly. This feature is realized by adjusting the range rate setting at 66 so that a particular rate of movement of the wiper arm of the potentiometer 58 is obtained. By controlling in a uniform manner the change in bias produced by the potentiometer 58, it will, of course, be understood that the delay incorporated into the circuit 40 is modified. Such a change in delay rate simulates the change in target range, thereby representing actual movement of the target at a controlled or uniform speed.

Further, the radar tester 10 is capable of measuring the receiver sensitivity of the radar set 16 undergoing test and this particular feature, as far as its operation is concerned, will now be explained. As hereinbefore stated, the delay circuit 40 emits a pulse after a predetermined lapse of time from having received a pulse from the amplitude comparison circuit 36. This pulse triggers the blocking oscillator 42. (As already made manifest, the output pulse from the blocking oscillator is also used to fire the thyratron tube 44.) This same output pulse which is of a predetermined width, namely a width corresponding to one microsecond, is fed to the pulsed oscillator 46 which produces a forty megacycle pulse to be delivered to the balanced modulator 48. The modulator 48 serves the purpose of combining the forty megacycle pulse from the pulsed oscillator 46 with the local oscillator signal produced by the reflex klystron 78. It is this modulated wave coming from the balanced modulator that is delivered to the transmitting antenna 56 to provide a radar signal to be sent to the radar set 16.

However, it is important to understand that the tester is capable of measuring the magnitude of power so transmitted. To this end, it is to be appreciated that the output of the balanced modulator consists primarily of the two sidebands of the local oscillator produced by the forty megacycle modulation. The lower sideband is at the radar frequency and is the only signal actually received by the radar set 16. However, the output from the balanced modulator 48 also includes power at a frequency forty megacycles above the radar frequency as well as power at 80 megacycles above the radar frequency.

When measuring receiver sensitivity as we are now concerned with, the variable attenuator 116 is adjusted until the crystal monitor microammeter 50 provides a current reading of a specified value. This, in effect, sets the modulator sideband output power to a known specific value.

After adjusting the attenuator 116, as above outlined, the variable attenuator 52 is then slowly increased until the attenuation introduced into the circuit is sufficient to cause the radar set 16 to fail to discern the transmitted signal. Stated somewhat differently, the variable attenuator 52, through its adjustment, is responsible for causing the radar receiving set 16 to "lose" the signal. Since the variable attenuator 52 is calibrated and other attenuations between it and the radar set 16 are essentially constant and known, the sensitivity of the radar received signal is determined merely from the reading of the attenuator 52.

From the procedure given in the foregoing operational sequence, it is believed that the simplicity of operation possible with the radar tester forming the subject matter of the present invention can readily be appreciated and understood. Should the radar receiving set 16 fail in any of the above-enumerated steps, then, of course, the particular trouble is narrowed down and further testing of the components of the radar set can be undertaken. The point and advantage to be emphasized at this time, however, is that the aircraft or other vehicle on which the radar set is mounted is not delayed or kept from active duty through a detailed investigation of the operational fitness of the various components making up the radar set. If the radar receiving set passes the general test made possible with the instant apparatus, then, of course, the craft on which it is mounted can be immediately released and its "turn around" time is minimized to a very marked extent.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A radar tester comprising means for producing a pulse proportional in amplitude to the peak of a received radar signal, means for providing a reference voltage of predetermined value, means for comparing said pulse with said reference voltage of predetermined value, means for generating a second pulse only when said first pulse differs in value from said reference voltage, and indicating means responsive to the second pulse for indicating whether said second pulse is above or below said reference voltage.

2. A radar tester in accordance with claim 1 in which said indicating means includes an indicating light, the tester further including a gas tube in circuit with said light for supplying electrical energy to said light when said gas tube is fired, said second mentioned pulse being responsible for firing said gas tube.

3. A radar tester comprising an antenna for receiving a transmitted radar signal pulse, means including a detector for producing a pulse proportional in magnitude to said signal pulse, a calibrated attenuator located intermediate said antenna and detector for attenuating a signal derived from said antenna and passing therethrough to said detector, means for comparing said proportional pulse with a reference signal of predetermined value to produce an output pulse indicative of whether said proportional pulse is greater in amplitude than said reference signal, and indicating means responsive to said output pulse for signifying the presence of an output pulse, whereby adjustment of said attenuator will provide an indication of the power received via said antenna when said indicating means has just begun to receive an output pulse from said comparison circuit.

4. A radar tester in accordance with claim 3 including a thyratron tube in circuit with said indicating means, said indicating means comprising a gas tube indicating light, whereby an output pulse from said comparison means will cause firing of said thyratron tube and concomitant energization of said gas tube indicating light.

5. A radar tester comprising an antenna for receiving a transmitted radar signal pulse, a fixed radar frequency attenuator, an automatic frequency controlled local oscillator, a mixer coupled to said attenuator and local oscillator for producing an intermediate frequency pulse, means for amplifying said intermediate frequency pulse, a calibrated attenuator for attenuating said intermediate frequency pulse, a detector for producing an output pulse for said intermediate frequency pulse having an amplitude proportional to the peak of said radar signal pulse, a comparison circuit for comparing the amplitude of said detector output pulse with a pre-set reference voltage to produce an output pulse from said comparison circuit when said detector output pulse is of greater amplitude than said reference voltage, a delay circuit for producing an output pulse at a predetermined time interval after receipt of a pulse from said comparison circuit, and a blocking oscillator for producing a pulse of predetermined width upon receipt of a pulse from said delay circuit.

6. A radar tester in accordance with claim 5 including a thyratron tube coupled to said blocking oscillator and a gas tube indicating light in circuit with said thyratron tube.

7. A radar tester in accordance with claim 5 including a pulsed oscillator coupled to said blocking oscillator, a modulator connected to said pulsed oscillator and said local oscillator, a calibrated variable attenuator coupled to said modulator, a crystal current monitor for measuring power flowing from said modulator to said variable attenuator, and a transmitting antenna for transmitting radar signals from said last mentioned attenuator to a radar set undergoing test.

8. A radar tester in accordance with claim 7 including a ferrite isolator disposed between said last mentioned attenuator and said transmitting antenna.

9. A radar tester in accordance with claim 5 including indicating means and transmission means, said transmission means comprising a pulsed oscillator and a modulator coupled to said pulsed oscillator and said local oscillator, a pulse from said blocking oscillator triggering both said indicating means and said pulsed oscillator.

10. A radar tester comprising means for receiving a radar signal pulse, a delay circuit for producing a pulse at a predetermined interval of time after receipt of a radar pulse, a pulsed oscillator operable to produce a pulse having a selected frequency, a local oscillator for providing a carrier wave frequency, a modulator for combining said oscillator pulse and said carrier wave, a calibrated variable attenuator, a crystal current monitor for measuring power flowing from said modulator to said attenuator, and means coupled to said attenuator for transmitting radar signals to a radar set undergoing test.

11. A radar tester comprising an antenna for receiving a transmitted radar pulse, a local oscillator, means for mixing the radar pulse with the output from said local oscillator to produce an intermediate frequency signal, means for amplifying the intermediate frequency signal, a calibrated variable attenuator for adjusting the attenuation of said intermediate frequency signal, a detector for demodulating said intermediate frequency signal to produce a pulse proportional in amplitude to the radar pulse, means for comparing the output pulse from said detector with a known reference voltage, an electronic delay circuit for producing a pulse at a predetermined time interval after receipt of a pulse from said comparison circuit, a blocking oscillator connected to said delay circuit to produce an output pulse having a certain width, a gas tube fired by the output pulse from the blocking oscillator, an indicating light in circuit with said gas tube for providing a visual indication of when said gas tube has been fired, a pulsed oscillator also connected to said blocking oscillator for producing a pulse having a predetermined frequency when triggered by an output pulse from said blocking oscillator, a modulator coupled to said local oscillator and said pulsed oscillator for producing a radar signal, and means for transmitting said radar signal.

12. A radar tester in accordance with claim 11 in which said local oscillator includes a variable attenuator, and there is further included in the tester a crystal current monitor ammeter for measuring the current output of said modulator, and a calibrated variable attenuator intermediate said modulator and said transmitting means.

13. A radar tester in accordance with claim 12 including a ferrite isolator in advance of said transmitting means.

14. A radar tester comprising a cavity resonator, a variable attenuator coupled to said cavity resonator, a directional coupler connected to said attenuator, a modulator for receiving power from said coupler, a pulsed oscillator for feeding a pulse having a predetermined frequency for modulating the output from said coupler, monitoring means for providing an indication of the magnitude of power from said modulator, a calibrated attenuator coupled to said modulator and an antenna for transmitting the signal received via said calibrated attenuator.

15. A radar tester in accordance with claim 14 including automatic frequency control means for controlling the frequency of said cavity resonator.

16. A radar tester in accordance with claim 14 in which said cavity resonator is a reflex klystron, the tester including circuit means for providing a reflector voltage to said klystron such that for a given mechanical tuning the power output is a maximum, switch means for cutting out said circuit means after the maximum power output has been realized, automatic frequency control means for controlling the frequency of said klystron, and switch means for cutting in said automatic frequency control means.

17. A radar tester comprising a reflex klystron, a variable attenuator coupled to said klystron, a directional coupler connected to said attenuator, a balanced modulator for receiving a signal from said coupler and combining said signal with a pulsed signal to be transmitted to the radar set undergoing test, a balanced mixer also connected to said coupler for mixing the signal from said coupler with an incoming radar signal to produce an intermediate frequency signal, automatic frequency control means for said I.F. signal, a source of D.C. reflector voltage for said klystron, a source of relatively small A.C. voltage for superimposition upon said D.C. voltage, means for comparing the phase relationship between said A.C. voltage and the A.C. component thereof appearing in the output of the klystron, servo motor means responsive to the phase comparing means, said phase comparing means determining the direction of rotation of said servo motor means, and means driven by said servo motor means for controlling said reflector voltage in accordance with the degree of phase unbalance between said A.C. voltage and said A.C. component appearing in the klystron output.

18. A radar tester comprising means for producing a signal derived from a radar signal received from a radar set undergoing test, means for transmitting a radar signal back to the radar set after a delayed interval of time, means for indicating when said derived signal is above a predetermined power level, means responsive to said derived signal for triggering said transmitting means into operation only if said received radar signal is above said predetermined power level, means for adjusting said interval of time to a desired value, and means for measuring the power of the signal transmitted to said radar set.

19. A radar set in accordance with claim 18 including means associated with the adjusting means for causing said adjusting means to adjust said interval of time at a uniform rate.

20. A radar tester comprising an atenna, local oscillator means including a klystron, means for mixing a radar signal received from a radar set via said antenna with the output from said local oscillator means to produce an intermediate frequency signal, means for first establishing a dominant mode operation of the klystron, means for automatically controlling the frequency of said klystron after the establishment of the dominant mode, means for amplifying said intermediate frequency signal, a calibrated variable attenuator coupled to said amplifying means, a detector for producing an output proportional to the received radar signal, and amplitude comparison means for comparing the detector output with a fixed reference voltage.

21. A radar tester in accordance with claim 20 in which said comparison means produces an output pulse when the detector output is greater than said reference voltage, the tester also including means indicating the presence of an output pulse from said comparison means.

22. A radar tester in accordance with claim 20 in which said comparison means produces an output pulse when the detector output is greater than said reference voltage, the tester also including a blocking oscillator triggered by the delay means to generate a pulse having a predetermined width, a pulsed oscillator coupled to said blocking oscillator for producing a pulse having a predetermined frequency, a modulator coupled to said local oscillator means and said pulsed oscillator for producing a radar signal, and means for transmitting the last mentioned radar signal back to said radar set.

23. A radar tester in accordance with claim 22 including means for providing an indication of the strength of said last mentioned signal.

24. A radar tester comprising an antenna for receiving a transmitted radar signal, means for producing a signal representative in magnitude to said received radar signal, means providing a reference signal of predetermined value, means for comparing said representative signal with said reference signal of predetermined value to produce an output signal indicative of whether said representative signal is greater than said reference signal, and indicating means responsive to said output signal for signifying the presence of an output signal.

25. A radar tester comprising an antenna for receiving a transmitted radar signal pulse, means for producing a pulse proportional in magnitude to said signal pulse, means providing a reference signal of predetermined valve, means for comparing said proportional pulse with said reference signal of predetermined value to produce an output pulse indicative of whether said proportional pulse is greater in amplitude than said reference signal, and indicating means responsive to said output pulse for signifying the presence of an output pulse.

26. A radar tester comprising means for producing a derived signal from a radar signal received from a radar set undergoing test, means for indicating when said derived signal is above a predetermined power level, means for transmitting a radar signal back to the radar set after a delayed interval of time, means responsive to said derived signal for triggering said last-mentioned means into operation only if said received radar signal is above said predetermined power level, and means for adjusting said interval of time to a desired value.

27. A radar tester in accordance with claim 26 including means associated with the adjusting means for causing said adjusting means to adjust said interval of time at a uniform rate.

28. A radar tester comprising an antenna for receiving a transmitted radar signal, means in circuit with said antenna for introducing a known amount of attenuation, means connected to said attenuating means for producing a derived signal, means for providing a reference signal of predetermined value, means for comparing said derived signal with said reference signal to produce an output signal indicative of whether said derived signal is greater in magnitude than said reference signal, and indicating means responsive to said output signal for signifying the presence of an output from said comparison means.

29. A radar tester in accordance with claim 28 in which said attenuating means includes a calibrated variable attenuator, whereby adjustment of said attenuator will provide an indication of the power received via said antenna when said indicating means has just begun to receive an output signal from said comparison circuit.

30. A radar tester comprising means for receiving a signal transmitted from a radar set undergoing test including means for attenuating the received signal a predetermined amount, means for producing a derived signal from the attenuated signal, means for indicating when said derived signal is above a predetermined power level, means for transmitting a radar signal back to the radar set after a delayed interval of time, means responsive to said derived signal for triggering said last-mentioned means into operation only if said received radar signal is above said predetermined power level, and means for adjusting said interval of time to a desired value.

References Cited in the file of this patent

UNITED STATES PATENTS

| | | |
|---|---|---|
| 2,421,016 | Deloraine et al. | May 27, 1947 |
| 2,425,600 | Coykendall | Aug. 12, 1947 |
| 2,454,219 | Schultz et al. | Nov. 16, 1948 |
| 2,477,485 | Jacob | July 26, 1949 |
| 2,492,356 | Cesareo | Dec. 27, 1949 |
| 2,505,525 | Clapp et al. | Apr. 25, 1950 |
| 2,597,297 | Corson et al. | May 20, 1952 |
| 2,765,460 | Marion | Oct. 2, 1956 |
| 2,781,511 | Pear | Feb. 12, 1957 |
| 2,857,593 | Schwab | Oct. 21, 1958 |
| 2,889,636 | Van Alstyne et al. | June 9, 1959 |